United States Patent [19]

McClain

[11] 4,123,008
[45] Oct. 31, 1978

[54] REACTOR DISTRIBUTION DUCT

[75] Inventor: Robert Woodrow McClain, Dallas, Tex.

[73] Assignee: Glitsch, Inc., Dallas, Tex.

[21] Appl. No.: 765,717

[22] Filed: Feb. 4, 1977

[51] Int. Cl.² .............................................. B01J 8/12
[52] U.S. Cl. ................................... 239/568; 239/559; 422/211
[58] Field of Search ............... 239/548, 552, 556, 557, 239/559, 566, 568; 23/288 R; 261/97, 98

[56] References Cited

U.S. PATENT DOCUMENTS

| 2,016,928 | 10/1935 | Lombardi | 239/548 |
| 2,639,224 | 5/1953 | McAfee | 23/288 R |

FOREIGN PATENT DOCUMENTS

| 206,868 | 12/1959 | Fed. Rep. of Germany | 23/288 R |
| 37,265 | 11/1930 | France | 23/288 R |
| 1,118,750 | 7/1968 | United Kingdom | 23/288 R |

Primary Examiner—Robert W. Saifer
Attorney, Agent, or Firm—John E. Wilson; Marvin A. Naigur; John J. Herguth, Jr.

[57] ABSTRACT

A distributor duct for a reactor which can be easily fabricated. The duct has an elongated back plate and an elongated perforated flat plate made up of flat segments separated by elongated angular breaks, and two flat marginal edge portions on the opposite sides thereof, the marginal edge portions being in flush engagement with, and welded to the back plate adjacent to the sides thereof, the flat segments defining with back plate a flow chamber.

5 Claims, 4 Drawing Figures

U.S. Patent  Oct. 31, 1978  Sheet 1 of 2  4,123,008
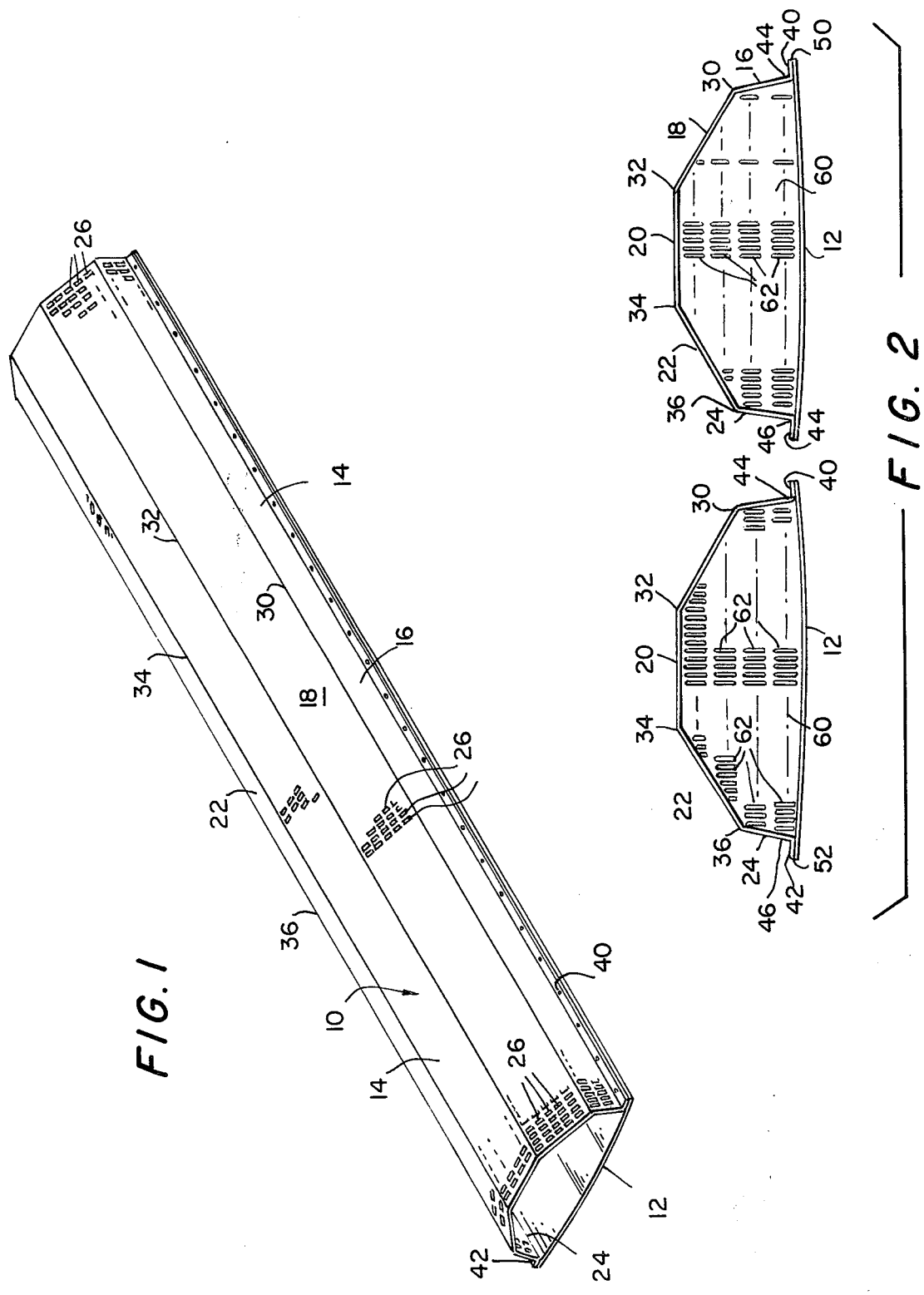

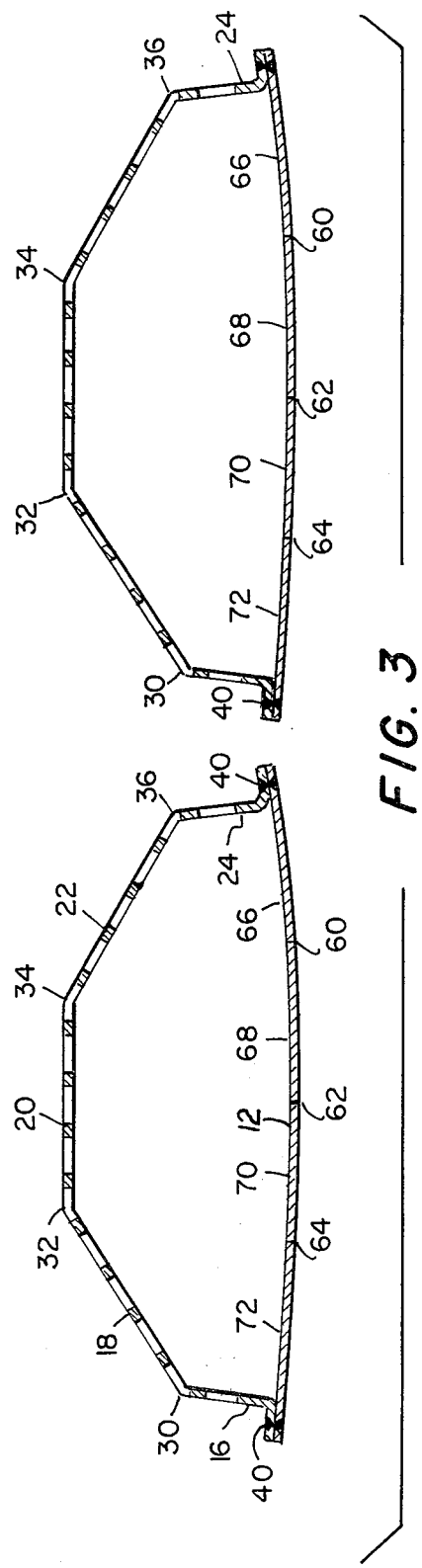
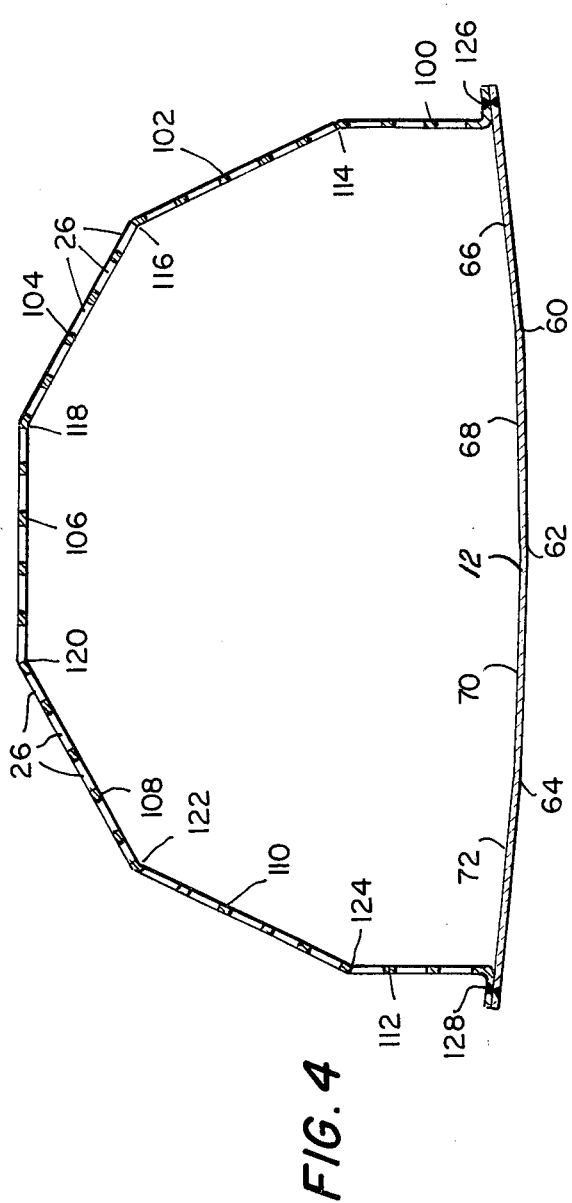

REACTOR DISTRIBUTION DUCT

BACKGROUND OF THE INVENTION

In industrial processes such as hydrocarbon conversion processes chemical reactions take place in a reactor vessel containing a catalyst bed. A fluid is brought into contact with the bed by flowing it downward close to the walls of the reactor vessel and then inward into contact with the catalyst.

In one arrangement the fluid passes downward through perforated ducts and flows out of the perforations along the length of the duct and into contact with the catalyst. The ducts used heretofor have consisted of an elongated back plate which is secured to the inside wall of the reactor vessel and a perforated front plate which is concave in cross section. The front plate and back plate are joined along their sides to define a flow chamber.

Such ducts have certain disadvantages. The front plate is conventionally formed by rolling it. Conventional rolling procedures cannot reliably form a front plate having side edges lying on a straight line. Thus, it is difficult to join the front plate to the back plate. If they are sucessfully joined the duct will be stressed so that it will be structrually weak.

SUMMARY OF THE INVENTION

It is an object of the present invention to overcome drawbacks found in the prior art such as those discussed above. Accordingly, an improved distributor duct is provided with an elongated back plate, an elongated front plate having a plurality of elongated perforated flat segments which are separated by elongated angular breaks, and two flat marginal edge portions on the opposite sides thereof, said marginal edge portions being in flush engagement with and secured to said back plate adjacent to the sides thereof, said flat segments defining with said back plate a flow chamber.

BRIEF DESCRIPTION OF THE DRAWINGS

FIG. 1 is a perspective view showing a duct made in accordance with the present invention;

FIG. 2 is an end view of several of the ducts;

FIG. 3 is a view of the opposite ends of the ducts of FIG. 2; and

FIG. 4 is an end view of a second embodiment of the present invention.

DETAILED DESCRIPTION OF THE PREFERRED EMBODIMENTS

The duct indicated generally as 10 and shown in perspective in FIG. 1 has an elongated back plate 12 and an elongated front plate 14. The front plate 14 consists of a plurality of elongated flat segments 16, 18, 20, 22 and 24 and each of the flat segments has many perforations 26. The flat segments are separated by a number of parallel angular breaks 30, 32, 34 and 36.

Extending outward from both of the sides of the front plate 14 are flat marginal edge portions 40 and 42 which are joined by angular breaks 44 and 46 to the flat segments 16 and 24 respectively. The flat marginal edge portions 40 and 42 engage against the back plate and are joined to it at its sides by welds 50 and 52.

The marginal edge portions 40 and 42 and their engagement with the back plate 12 is shown in FIG. 2. In FIG. 2, two ducts are shown from the ends thereof. They are spaced apart a distance comparable to that which would be appropriate for some applications. The end plates 60 which cover the ends of the ducts each has a plurality of perforations 62. In practice the end plates 60 would be placed in the ends of the duct other than the ends where the fluid would be introduced.

FIG. 3 is an end view of the same two ducts shown side by side in FIG. 2. They are shown in FIG. 3 at the end opposite to that shown in FIG. 2. FIG. 3 also shows in greater detail the back plate 12 which is not flat over its width, having longitudinally extending angular breaks, 60, 62 and 64 defining the longitudinally extending flat panels 66, 68, 70 and 72. The back plate 12 is thus contoured to fit against the inside wall of a reactor which is generally cylindrical in configuration.

FIG. 4 shows a modification which differs from the embodiment of FIGS. 1-3 in that it has a greater number of flat segments. Instead of five flat segments it has seven flat segments 100, 102, 104, 106, 108, 110 and 112 and angular breaks 114, 116, 118, 120, 122 and 124 between the flat segments. The back plate 12 is identical to the ones shown in FIGS. 1 through 3 as the flat marginal edge portions 126 and 128 are secured to the back plate 12 as are the marginal edge portions 40 and 42 of the first embodiment. As in the first embodiment, the embodiment of FIG. 4 has many perforations 26 on the flat segments.

Although the perforations are shown in perpendicular rows it is understood that they could be arranged differently. For example, they could be arranged so that perforations in adjacent rows are not aligned with one another. It has been found that such an arrangement allows the front plate to be formed with less internal stress that when the perforations are aligned as shown.

The foregoing describes but several preferred embodiments of the present invention, other embodiments and modifications being possible without exceeding the scope of the present invention as described in the following claims.

I claim:

1. An improved distribution duct for a reactor vessel comprising:
    an elongated back plate;
    an elongated front plate having a plurality of elongated perforated integral flat segments separated by elongated angular breaks, and two flat marginal edge portions on the opposite sides of said front plate, said marginal edge portions being in flush engagement with and welded to said back plate adjacent to the sides thereof, said flat segments defining with said back plate a flow chamber.

2. The improved distribution duct defined in claim 1 wherein there are five perforated flat segments.

3. The improved distribution duct defined in claim 1 wherein there are seven perforated flat segments.

4. The improved distribution duct defined in claim 1 wherein said back plate is made up of a plurality of longitudinal integral flat panels joined at longitudinally extending annular breaks.

5. The improved distribution duct defined in claim 1 further comprising a perforated end plate adjacent to one end of said duct and perpendicular to said front plate and said back plate.

* * * * *